Oct. 26, 1965     R. L. SMIRL ETAL     3,213,983
FLUID ACTUATED TRANSMISSION DEVICE
Filed Aug. 26, 1963     7 Sheets-Sheet 1
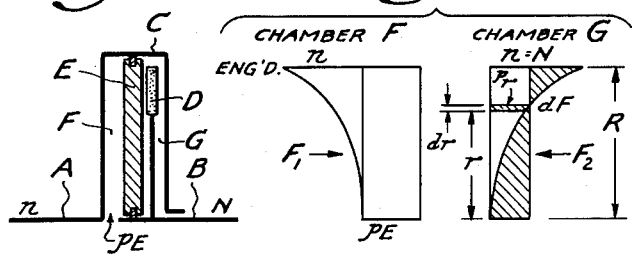
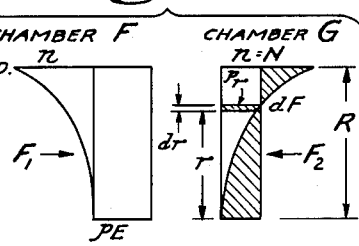
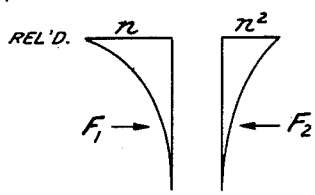
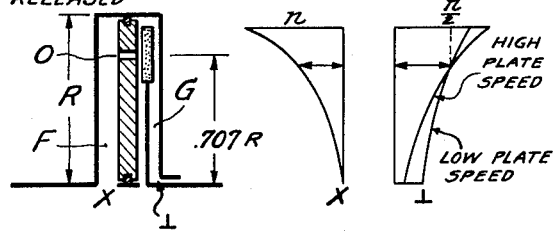
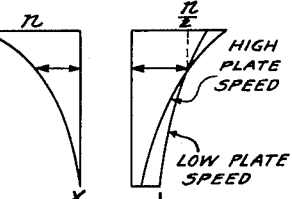
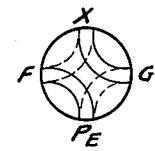
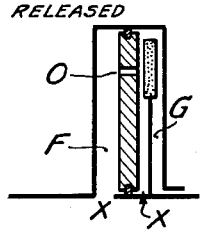
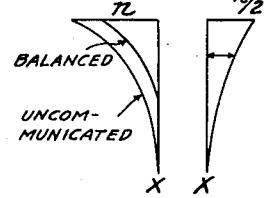
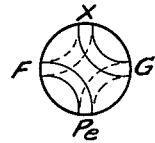
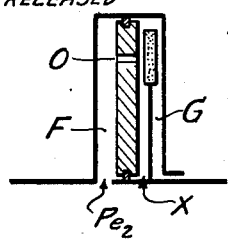
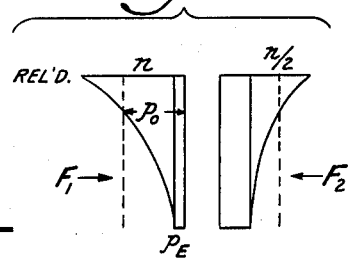
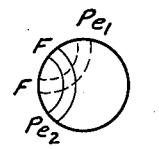
Inventors:
Mieczyslaw J. Waclawek
and Richard L. Smirl
By: Joseph W. Malleck Atty.

Oct. 26, 1965   R. L. SMIRL ETAL   3,213,983
FLUID ACTUATED TRANSMISSION DEVICE
Filed Aug. 26, 1963   7 Sheets-Sheet 2
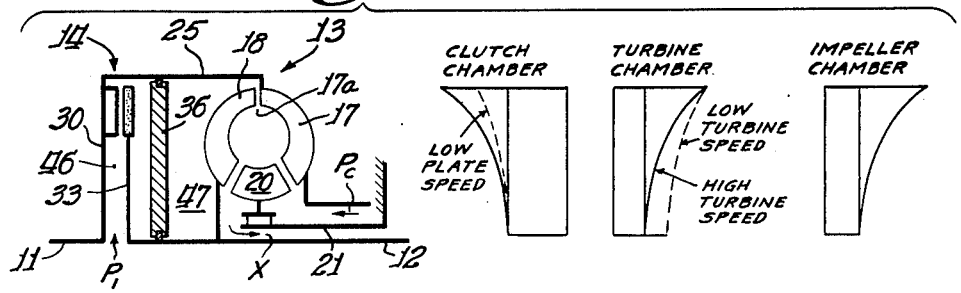
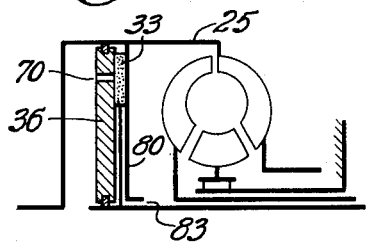
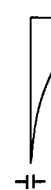
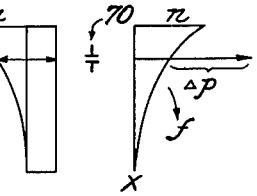
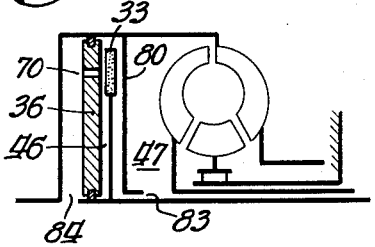
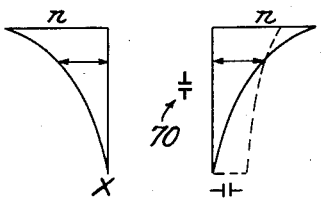
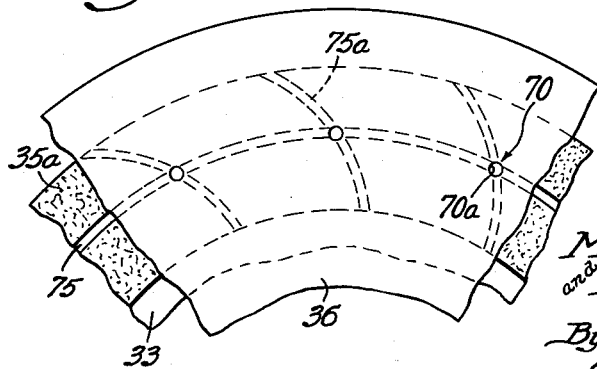
Inventors:
Miczyslaw J. Waclawek
and Richard L. Smirl
By: Joseph W. Malleck Atty

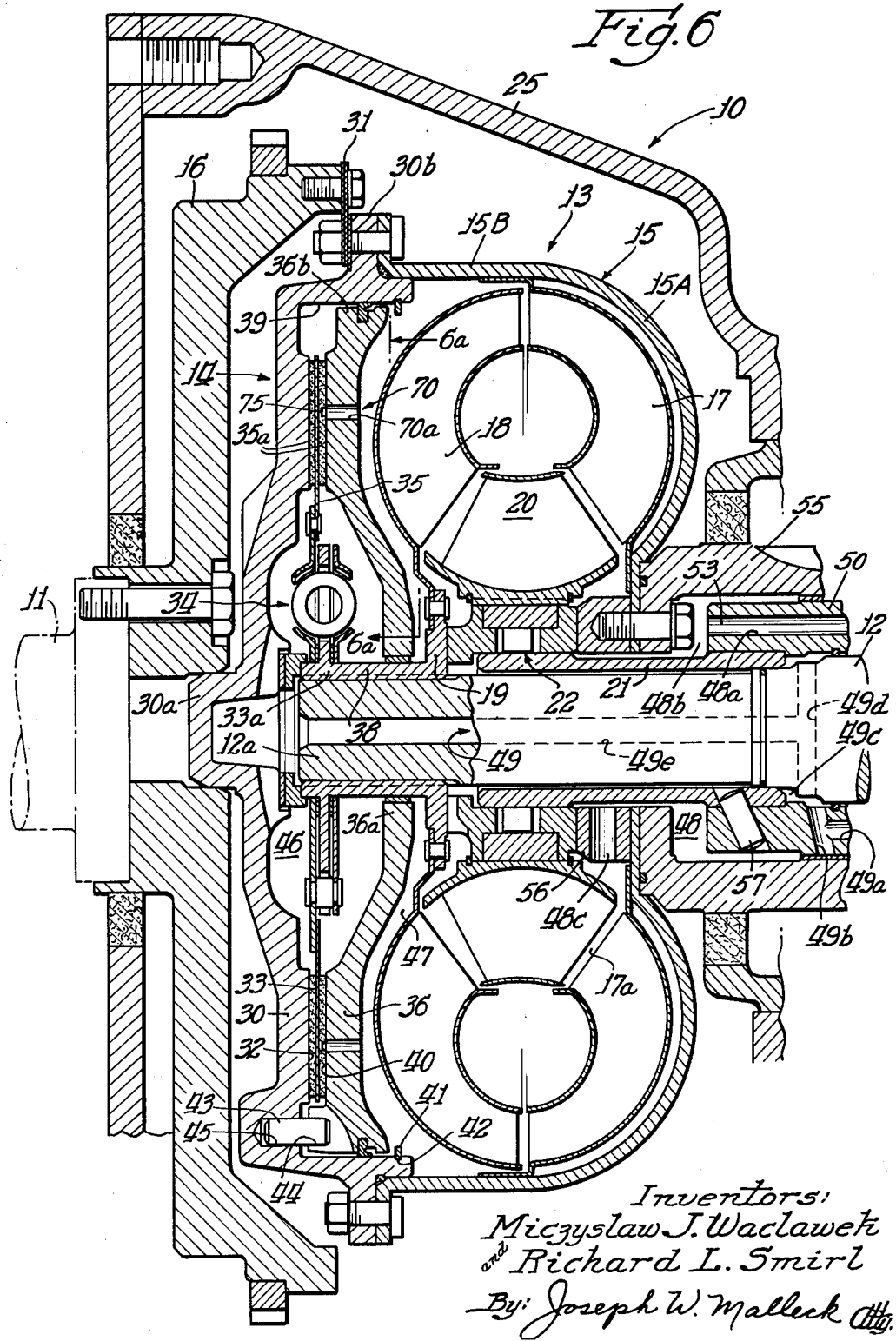

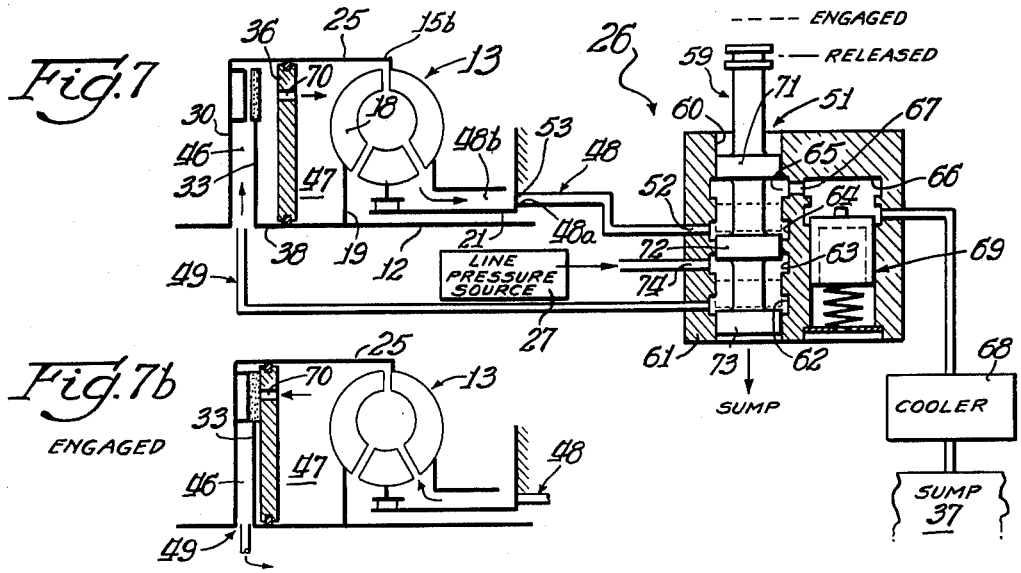
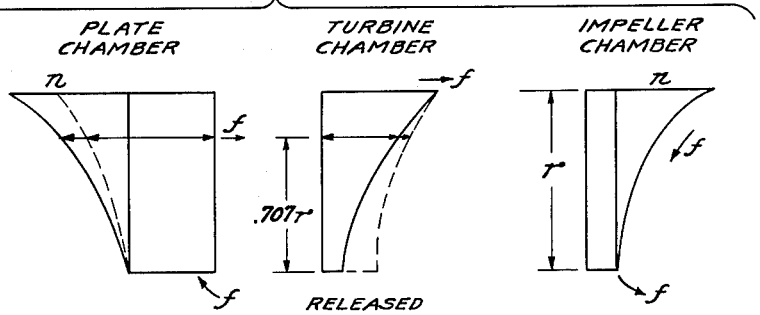
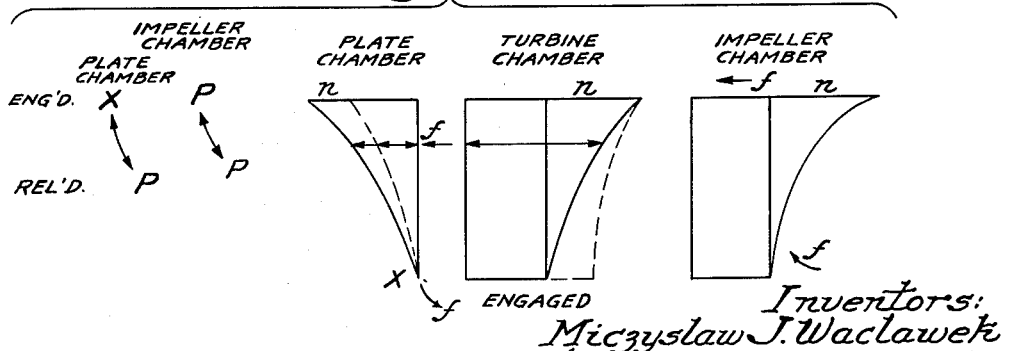

Oct. 26, 1965  R. L. SMIRL ETAL  3,213,983
FLUID ACTUATED TRANSMISSION DEVICE
Filed Aug. 26, 1963  7 Sheets-Sheet 5
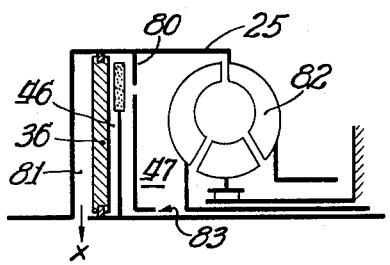
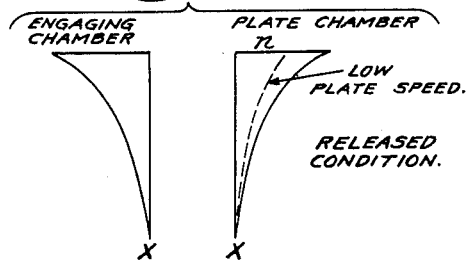
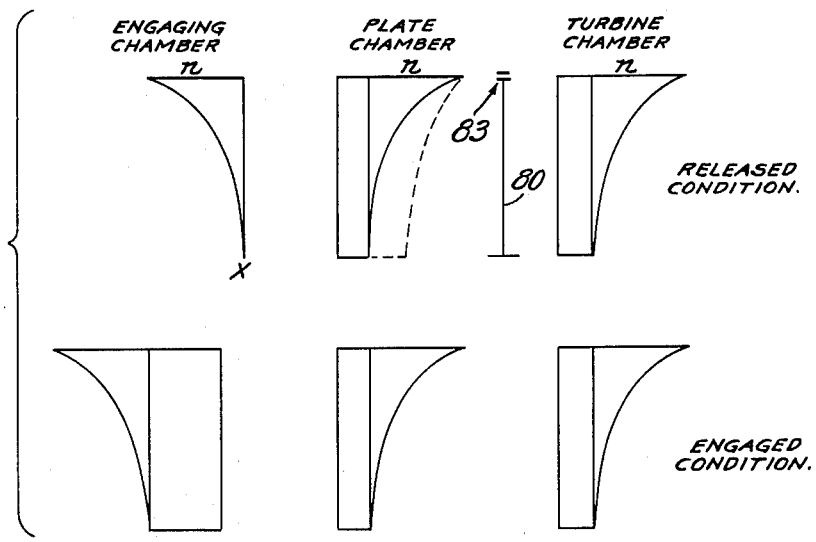
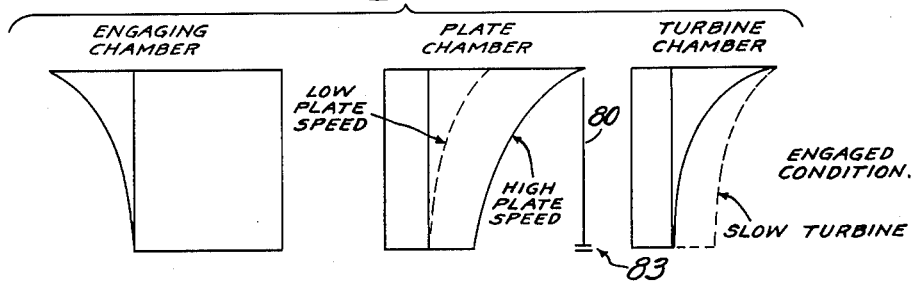

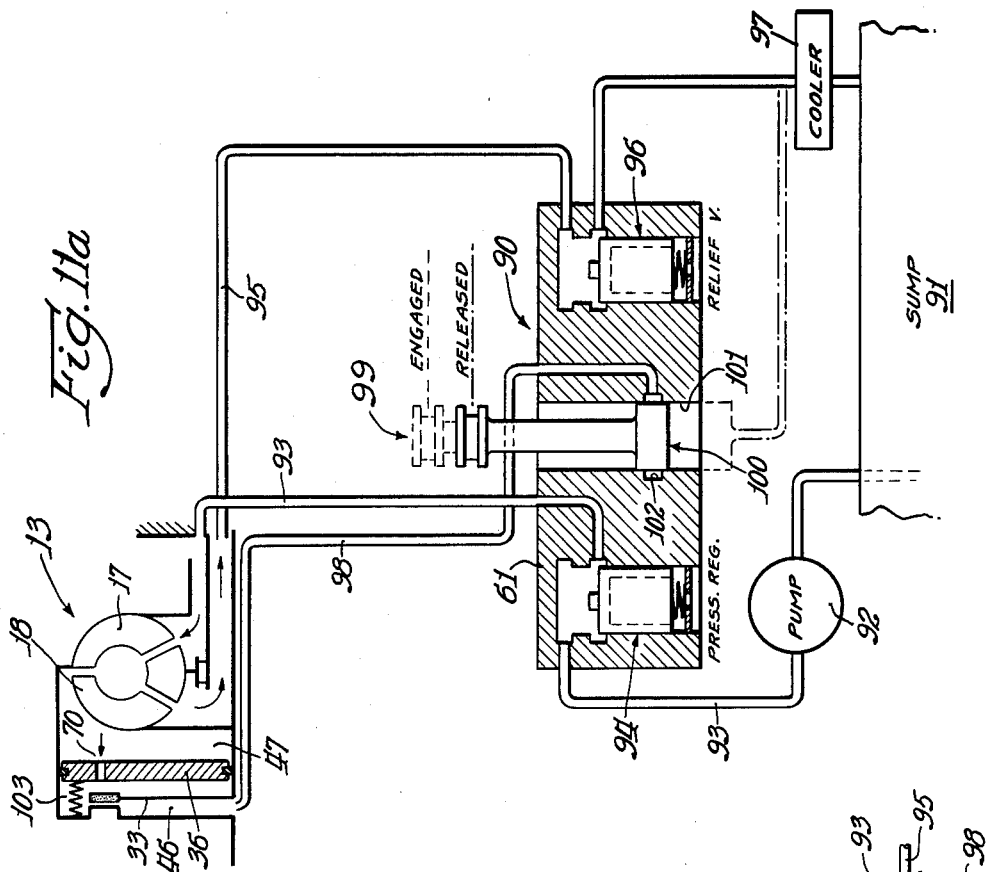
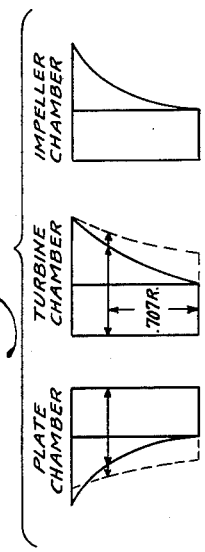
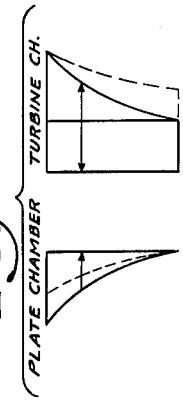

United States Patent Office 3,213,983
Patented Oct. 26, 1965

3,213,983
FLUID ACTUATED TRANSMISSION DEVICE
Richard L. Smirl, La Grange Park, and Miczyslaw J.
Waclawek, Olympia Fields, Ill., assignors to Borg-
Warner Corporation, Chicago, Ill., a corporation
of Illinois
Filed Aug. 26, 1963, Ser. No. 304,473
30 Claims. (Cl. 192—3.2)

This invention relates to transmission devices and more particularly to wet-type clutch mechanisms as used with transmissions for providing alternative or dual power trains, one of which is through a fluid operated torque converter and another of which is through the fluid operated lock-up clutch mechanism.

It is commonly known that torque converters have the characteristic of providing relatively poor efficiency at high speeds particularly in the high range approaching a fluid coupling condition. Because of this, it has become the practice to provide a lock-up clutch in the transmission which is applied when the torque converter approaches the range in which it is least efficient. However, it has been recognized by the inventor herein that present transmission constructions using a fluid operated lock-up clutch in conjunction with a torque converter, results in a general reduction in transmission operating efficiency when the clutch assembly is in the intended disengaged condition.

Up until now, it has not been quite apparent what physical condition causes this reduction in efficiency, although it has been generally attributed to the use of a lock-up clutch assembly. The effect of low range losses is significant, particularly in agricultural vehicles including tractors, which operate in the fluid coupling ranges of the transmission for extended periods of time. This condition is also particularly serious for automotive vehicles and a reduction in efficiency has been determined to be as much as 20%.

This invention is comprised in part of the recognition and isolation of the physical means causing such loss in efficiency and in part the provision of structural means which totally remove it in a highly simple and economical manner which is adaptable to a wide variety of presently produced transmissions. More specifically, it has been found that due to varying pressure conditions at different speeds of the transmission, the lock-up clutch will have a tendency to drag even though the associated controls have been placed in the disengaged or released condition. The actuating piston of the lock-up clutch assembly is urged by differential pressure forces acting on opposite sides thereof to engage the clutch plate. Thus, there will be an unwanted degree of split in the power train leading both through the torque converter and through the lock-up clutch assembly. Although the input torque through the transmission is not lost, nonetheless there is a power loss since all of the torque is not multiplied by the torque converter as is desired in the released condition of the clutch.

The differential pressure forces acting on opposite sides of the actuating piston of the lock-up clutch may be directly attributed to a different circulation of fluid on opposite sides thereof. For example, consider a reverse acting type lock-up clutch assembly (positive pressure used to disengage clutch) in which the actuating piston divides the clutch assembly housing into first and second chambers and in which the clutch plate is in the first chamber with the converter elements in the other. That part of the pressure distribution due to a centrifugal pressure head acting against opposite sides of the actuating piston will be affected by the presence of the rotatable clutch plate when it turns at a slower rotational speed than the housing. Generally speaking, the speed of the fluid circulating within the various chambers of the clutch assembly housing will be a compromise between the speeds of the housing and the clutch plate. In the second chamber, assuming for the moment that there are no other rotatable members therein, the fluid will circulate at a speed depending solely on the speed of the clutch assembly housing. In the reverse acting type of lock-up clutch assembly, it is important that a higher force due to fluid pressure be maintained within the first chamber containing the clutch plate in order to move the actuating piston from the clutch plate. However, it has been found that variations in the centrifugal pressure heads at varying rotational speeds of members in the first and second chambers may at times cause the total pressure in the second chamber to become greater and thereby promote a light re-engagement of the clutch plate resulting in the unwanted drag as mentioned above.

Variations in the construction of the clutch assembly and torque converter combination undoubtedly will add more factors which must be considered in identifying the manner in which the fluid centrifugal pressure heads will vary under operating conditions. Such factors may include connection of the turbine of the torque converter with the clutch plate as opposed to constructions wherein the elements are not on a common shaft, the clutch plate may have a different diameter than the actuating piston for the clutch assembly, or a variation in the type of hydraulic controls used to promote clutch engagement.

The first step in the obviation of the above problem, as contemplated by the invention, comprises recognition that the average centrifugal pressure force which will work against a given surface due to a circulating body of fluid, always occurs at a precise radial location relative to the radial dimension of the circulating fluid body. Empirically, the location has been derived as being .707 of the radial dimension of the circulating fluid body. With this information, the second step of the invention contemplates providing fluid communication means at a predetermined radial location so that the average pressure force in one chamber will be communicated to another chamber and thereby control the total fluid pressure forces which inevitably will vary due to changes in velocity of the circulating fluid in each chamber.

More specifically, the structural solution comprises the employment of aperture means in the wall or walls defining the chambers of the lock-up clutch assembly (the wall may be the actuating piston or fixed partitions) and which aperture means are characterized by being located at mathematically determinable distances from the axis of rotation of the transmission to insure that the fluid pressure acting against a selected side of the actuating piston will always be great enough for disengagement of the clutch when desired. The aperture means comprises one or more orifices communicating adjacent chambers of the clutch assembly and are calibrated and disposed so that the centrifugal pressure head of fluid circulating in adjoining chambers will be forced into balance or into a condition where the pressure difference will be weighted in favor of maintaining the clutch disengaged. Since the pressure in each of the chambers must be identical at the point adjacent opposite ends of the orifice, this forces or dictates that changes in the pressure distribution across opposite sides of the actuating piston must vary in a manner to maintain equality at these points. Precise calibration and location will insure that the pressure distribution changes will afford the desired results.

Therefore, a primary object of this invention is to provide a new and improved transmission of the type employing a hydraulically actuated clutch which is fully responsive to hydraulic controls therefor.

Another object of this invention is to provide a new and improved transmission utilizing a fluid operated lock-up clutch assembly in conjunction with a hydraulic coupling device and which transmission is adapted so that unwanted drag of the clutch assembly is eliminated during the released condition thereof, not only to improve the efficiency of the transmission but also to promote a safety factor in insuring that the intended power train will be effected only according to the control thereof.

Another object of this invention is to provide aperture means having optimum location and functioning to communicate two or more chambers of the lock-up clutch assembly to assure complete responsiveness to controls therewith and comprising one or more orifices calibrated to provide a predetermined pressure drop between said chambers.

Another and more particular object of this invention is to provide a transmission of the type utilizing a fluid operated torque converter and lock-up clutch assembly, in which fluid chambers of the lock-up clutch assembly are communicated by one or more orifices provided in the walls separating said chambers, and having the orifices located so that the ratio of the distance from the center of each orifice to the rotational axis of the assembly is to the distance between the outermost interior extent of the assembly and the axis thereof is substantially .707.

Another object of this invention is to provide a transmission substantially in accordance with the preceding object, but in which the communicating orifices are located so as to control variations in the centrifugal pressure heads in each of said assembly chambers to provide an increase (rather than a balance) of pressure in that chamber needed to assure a differential over the other chamber for maintaining the clutch assembly disengaged; the location is adapted to provide a safety factor as well as to overcome other physical factors in the transmission system such as oil viscosity or a difference in plate size from that of the actuating piston. More specifically, this object is to locate orifices outwardly or inwardly of the position that they would occupy in accordance with the ratio .707.

Still another object of this invention is to provide a transmission in accordance with the preceding object and which is adapted to have one of a variety of hydraulic control means which is specifically adapted to more effectively simplify the operation of the transmission combination with the aforementioned orifices in the clutch assembly.

Yet another object of this invention, in the broad aspects hereof, is to provide a transmission having a hydraulic lock-up clutch assembly adapted to reduce the normal clutch wear usually experienced by the assembly. This may in part be accomplished by providing circulation of fluid between clutch chambers and the torque converter, thereby resulting in a cooling effect.

Yet another object of this invention is to provide a transmission having a hydraulic lock-up clutch assembly with means to obviate the problem of clutch drag; the latter means being characterized by its ability to be easily adapted to transmissions now in the field having substantial differences in construction.

In certain types of fluid operated lock-up clutches, the orifices of this invention may be used to communicate chambers of the clutch and the torque converter resulting in a secondary advantage. The torque converter may be charged with fluid during the converter range of the transmission, with oil circulated through the lock-up clutch. This is particularly true of a clutch arrangement whereby the positive line pressure used to disengage the clutch assembly may be so employed, such advantage is accordingly an object of this invention.

Other objects and features of the invention will be readily apparent to those skilled in the art from the specification and appended drawings illustrating certain preferred embodiments in which:

FIG. 1 is a schematic illustration of a wet-type hydraulic clutch which is representative of prior art constructions;

FIG. 1a is a composite of fluid pressure distribution charts and which act upon the piston of FIG. 1 at an input speed of n and illustrating the forces required to promote clutch engagement;

FIG. 1b is a composite of fluid distribution charts as in FIG. 1a, but illustrating the released condition of the clutch;

FIG. 2 is a schematic illustration of a wet-type clutch incorporating the principles of this invention and utilizing one type of simplified controls;

FIG. 2a is a composite of fluid distribution charts for the clutch illustration of FIG. 2 and illustrating the disengaged condition of the clutch;

FIG. 2b is a chart disclosing control conditions for each of the chambers of FIG. 2;

FIG. 2c is a schematic illustration of the simplified control for FIG. 2;

FIGS. 3–3c are illustrations similar to those of FIGS. 2–2c, but utilizing another type of basic simplified controls;

FIGS. 4–4c are illustrations similar to those of FIGS. 2–2c, but utilizing still another type of controls for the clutch construction;

FIG. 5 is a schematic illustration and including a composite of fluid distribution charts for the construction thereof, illustrating a typical reverse-acting type of lock-up clutch and converter combination now known in the art;

FIG. 6 is a central sectional elevational view of a reverse-acting lock-up clutch and torque converter combination similar to that of FIG. 5, but incorporating the principles of this invention;

FIG. 6a is a fragmentary plan view of a portion of the clutch plate shown in FIG. 6;

FIG. 7 is a schematic illustration of the clutch and torque converter combination of FIG. 6 and illustrating in the schematic form one type of control system that may be used therewith and forming a part of the present invention;

FIG. 7a is a composite of fluid distribution charts representing the pressures acting upon the chambers of the construction of FIG. 7;

FIG. 7b is a schematic illustration of the clutch and torque converter combination of FIG. 7, here shown in the engaged condition;

FIG. 7c is a composite of fluid distribution charge representing the pressure conditions in each of the chambers for the condition of FIG. 7b;

FIG. 8 is a schematic illustration of a positive acting lock-up clutch and torque converter combination and illustrating a typical construction now known in the art;

FIG. 8a is a composite of fluid distribution charts representing the forces in the chambers of the construction of FIG. 8 and depicting the conditions when there is included a fluid orifice disposed at the outer periphery of the turbine chamber;

FIG. 8b is a composite of fluid distribution charts representing the forces within the chambers of FIG. 8 and depicting the conditions when there is a fluid orifice disposed at the inner periphery of the turbine chamber; the engaged condition of the clutch is illustrated;

FIG. 8c is a composite of fluid distribution charts for the prior art construction of FIG. 8 and depicting the conditions when an opening is provided within the clutch plate chamber and disposed at the inner periphery thereof; the release condition of the clutch is illustrated;

FIG. 9a is a schematic illustration of a positive acting lock-up clutch and torque converter combination like that in FIG. 8 but incorporating the principles of this invention;

FIG. 9b is a composite of fluid distribution charts for the construction of FIG. 9a and representing the engaged condition of the clutch when fluid communication is shut off between the chambers during such condition;

FIG. 9c is a composite of fluid distribution charts like that in FIG. 9b but illustrating the conditions when fluid communication is not shut off between the chambers during the engaged condition of the clutch;

FIG. 10a is a schematic illustration of a lock-up clutch and torque converter combination as in FIG. 9a and representing the disengaged condition thereof;

FIG. 10b is a composite of fluid distribution charts for the condition of the construction of FIG. 10a;

FIG. 11a is a schematic illustration of still another type of lock-up clutch and torque converter combination utilizing still another type of controls therewith; the illustration shows the disengaged condition of the clutch;

FIG. 11b is a composite of fluid distribution charts for the condition of the construction of FIG. 11a;

FIG. 11c is a schematic illustration of the construction of FIG. 11a representing the engaged condition thereof.

FIG. 11d is a composite of fluid distribution charts for the condition of the construction in FIG. 11c;

FIG. 12a is still another illustration of a lock-up clutch torque converter combination utilizing still another type of controls therewith and showing the disengaged condition of the clutch;

FIG. 12b is a composite of fluid distribution charts for the condition of the clutch of FIG. 12a;

FIG. 12c is a schematic illustration of the construction of FIG. 12a representing the engaged condition of the clutch; and FIG. 12d is a composite fluid distribution chart for the condition of the clutch of FIG. 12c.

Turning now to the drawings and more particularly to FIGS. 1–1c, there is schematically illustrated a typical wet-type clutch now known in the art and comprising a rotatable input member A drivingly connected to a housing C, and a rotatable output member B drivingly connected to a clutch plate D disposed within the housing C. A slidable piston E divides the interior of the housing into two chambers F and G and cooperates with a conventional control system, whereby chamber G is drained by a small port at the inner periphery thereof and chamber F is used to actuate the piston by an on and off flow of line pressure $P_e$ thereto. Input member A will rotate at a given speed $n$ and the output member B will rotate at a speed $n$ much slower than than of the input member when disengaged. The fluid conditions prevailing in chambers F and G during the engaged condition of the clutch are illustrated in FIG. 1a; the fluid distribution charts of FIG. 1a show pressure plotted along abscissa and the radial distance from the inner periphery of the circulating fluid body to the outer periphery is plotted along the ordinate. In the engaged condition, with the input member at speed $n$, the entire pressure distribution $F_1$ is attributed to the static pressure force of the engaging pressure supplied from the line and the centrifugal pressure head, which is of a variable nature depending upon the speed of the input member. Fluid which is capable of passing the piston seals so as to be present in chamber G will have a pressure force $F_2$ due solely to centrifugal forces, having no static component.

According to the typical art, to release the clutch, the static pressure force is removed from chamber F, leaving the remaining fluid therein subject only to centrifugal forces. However, since the clutch plate D is disconnected and will typically rotate at some variable speed slower than the input member, here taken to be zero with the output stalled, the circulating velocity of the fluid in chamber G will be a compromise between the speed of the members which impart such rotation and the compromise speed will be necessarily lower than that in chamber F. Clutch plate D contributes heavily to the reduction in the circulating velocity since it is here assumed to be stalled with the fluid rotating at half the speed of the input member. Thus, it can be seen quite readily that a condition may prevail where the centrifugal pressure distribution in chamber F will exceed that in chamber G even through the controls are in the clutch released condition, and the clutch plate will drag.

To obviate such problems, the first phase of this invention comprised recognition that the average centrifugal pressure force will always occur at a predetermined radial distance of the circulating body. Mathematically, this can be derived by integrating the total force enclosed within the shaded area of the pressure graph of chamber G of FIG. 1a. Since the force equation is pressure times the area across which it works, we find the total force to be as follows:

$dF = (2\pi r dr)P_r$
$dF = 2\pi r dr(.424)r^2 n^2$
$dF = .848\pi n^2 r^3 dr$ $$F = .848\pi n^2 \int_0^R r^3 dr$$

$$F = .848\pi n^2 \left[\frac{R^4}{4}\right]$$

$F = .212\pi n^2 R^4 = .667 n^2 R^4$

We know the pressure due to centrifugal forces is equal to $.424 r^2 n^2$; if we empirically derive that the average pressure force will occur at .707 of the radius of the circulating body and substitute this value in the centrifugal pressure equation and further convert to force, we find that the factored result equals the results of the force equation which we derived by integration.

$P_r = .424 r^2 n^2$
Average $P_A = .424 n^2 (.707R)^2$
$P_A = .212 n^2 R^2$
$F = A P_A$
$F = \pi R^2 (.212 n^2 R^2)$
$F = .667 n_2 R_4$ With this information, we always known that whatever pressure is sensed at the .707 radius location, this value multiplied by the total area against which the pressure acts will give the total force. And we also note that the shaded area, as characterized in FIG. 1a of chamber G located below the .707 radius, will always equal the shaded area which occurs above the .707 radius location when multiplied by the area across which the pressure acts.

Recognition of the location of the average pressure force permits structural application to the construction of FIG. 1 to prevent inadvertent engagement of the piston. This may be accomplished by at least three principal solutions, which are independently characterized in the series of FIGURES 2, 3 and 4. In FIG. 2 the piston member which divides the interior of the housing into the chambers F and G is provided with a communicating orifice O located at the mathematically determined radius of .707R of the circulating fluid body, so that the fluid communication will force the fluid in each chamber to be equal at that precise location. Thus, the average pressure forces will be equal and accordingly the total centrifugal pressure heads will also be caused to be equal. In the solution of FIGS. 2–2c the controls contemplate feeding chamber F with line pressure or engaging pressure $P_e$, while exhausting (X) chamber G during the engaged condition of the clutch; to disengage the clutch, chamber F is exhausted (X) while chamber G is sealed off (⊥) at the inner periphery. This may be accomplished by simple rotary control as shown in FIG. 2c, the full-line conduits representing the connections for the engaged connection and the dotted-outline conduits representing the disengaged connections.

With such a system the fluid distribution, during the disengaged condition, will be as represented in FIG. 2a. Thus, no matter how slow the clutch plate may be rotating, or how it may affect the velocity of the circulating body in chamber G, the total fluid force in chamber G will always equal that in F, even if fluid must be drawn from chamber F to provide such equalization. Drawing of fluid will be necessary since chamber F will always have to have a zero pressure at the exhaust opening.

In FIGS. 3–3c another solution is represented which is similar to FIG. 2, except that during the disengaged condition of the clutch both chambers F and G are exhausted at their inner peripheries. A simple control to accomplish this is schematically shown in FIG. 3c with the fluid communicating orifice O, the total pressures will be equalized in both chambers regardless of the relative rotations of the circulating fluid body in each chamber. With the communicating orifice, the pressure distribution will shift from the uncommunicated curve, as shown in FIG. 3a, to the balanced pressure curve.

The solution of FIGS. 4–4c is again similar to FIG. 2, except that line pressure of two different degrees is employed; a first high pressure $P_e$, for example 50 p.s.i., will be employed to engage the piston while a reduced line pressure $P_{e_2}$ of one tenth the larger pressure, for example 5 p.s.i., will be supplied to the chamber F during the disengaged condition to maintain a slight charge pressure. At all times chamber G will be exhausted. In such a system, fluid will continuously circulate through the communicating orifice and have a continuous flow not present in the solutions of FIGS. 2 and 3. Here the communicating orifice O is adapted to be of a rather large size so that a definite pressure drop will not occur between the chambers, while the exhausting orifice (X) in chamber G will be of a relatively smaller nature.

To accomplish the solution of FIG. 4, simplified controls as shown in FIG. 4c may be utilized, requiring only that the line pressure of two different degrees may be selectively communicated to chamber F. As shown in FIG. 4a, the fluid pressure distribution in the released condition of the clutch will have a relatively small static pressure in chamber F due to the reduced line pressure and a centrifugal pressure head which will have a definite broader curve due to the input speed $n$. In chamber G the communicating orifice will cause the average pressure force $P_o$ therein to draw fluid from chamber F, and derive the distribution as shown in FIG. 4a. Since the speed of the circulating fluid body in chamber G will be slower due to the clutch plate, the centrifugal curve will be much steeper and the pressure at the radial inner periphery will be of a higher value than that in chamber F.

The above solutions illustrate the various accommodations that may be used to obviate the problem of fortuitous engagement by the precise application of a communicating fluid orifice means. There may be a flow condition between the chambers, the chambers may be trapped with fluid therein, or the chambers may be fully exhausted with only residual fluid pressure remaining therein under centrifugal forces. Nonetheless, the result will be the same in that a perfectly balanced fluid condition may be achieved and maintained in each of the chambers.

Turning now more specifically to a preferred embodiment of this invention, a reverse-acting type lock-up clutch in combination with a torque converter is illustrated in FIG. 6. However, to indicate the advance over the prior art, a typical construction now known in the art is schematically represented in FIG. 5 along with the fluid conditions experienced. Similar parts shall be identified similarly in FIGS. 5 and 6, except differences as to the orifice means O and the accompanying hydraulic controls.

The embodiment comprises a transmission, generally designated 10, having drive and driven shafts, 11 and 12 respectively, a typical gear unit (not shown) is located at the rear thereof, a torque converter 13, and a lock-up clutch assembly 14, all enclosed within a housing 25. Hydraulic controls for the torque converter and fluid operated lock-up clutch are shown in FIG. 7, and are hereafter designated 26. The torque converter and lock-up clutch assembly are associated so that each have their driven members connected to the same shaft 12 of the transmission.

Referring now more specifically to the torque converter 13, it comprises a fluid casing 15 having a semi-toroidal shell or portion 15A integral with a generally cylindrical portion 15B extending to one side thereof; the portion 15A is drivingly connected to a flanged portion 16 forming a part of the input shaft 11. The torque converter further comprises the usual elements of a Schneider type hydraulic converter in which an impeller 17 is connected to the semi-toroidal portion 15 and is driven thereby, a turbine 18 mounted upon a hub 19 which in turn is splined to the output shaft 12, and a stator 20 or reaction member mounted about a sleeve shaft 21 by way of a one-way friction device, here preferably shown to be a sprag type clutch 22. The sleeve shaft 21 is interconnected with portions of the housing 25 (not shown); the semi-toroidal portion 15a of the torque converter is connected in conventional fashion to an oil pump (not shown) and is adapted to generate a suitable source of pressurized hydraulic fluid 27 for operation of the torque converter and fluid operated lock-up clutch assembly. Each of the elements of the torque converter may be of sheet metal construction and suitable seals and bearings are provided between the sleeve shaft and the output shaft and elements of the one-way brake device in conformity with the conventional introduction of fluid to and from the hydraulic torque converter.

The operation of the torque converter is well known, wherein rotation of the impeller in a forward direction will cause rotation of the turbine in the same direction at an increased torque due to the reaction provided by the blade portions of the stator intending to urge the stator in a reverse direction, which tendency is overcome by engagement of the one-way braking device. As the speed of the rotation of the turbine approaches that of the impeller, the force imposed upon the blade of the stator will reverse in direction to cause rotation of the stator in a forward direction with consequent over-running of the one-way device. Thereafter, the torque converter could function theoretically and substantially as an ordinary fluid coupling in which the impeller, the turbine, and the stator all rotate at substantially the same rotational speed.

Turning now more specifically to the lock-up clutch 14, it comprises an annular driving member 30 connected to the input shaft and has a central portion 30a adapted to journal one end 12a of the shaft 12 and in turn being journaled in the central portion of flange 16 of the input shaft 11. The manner of connection of the driving member 30 to the input shaft is by way of flanged portion 16 interconnected by drive straps 31 to an outwardly extending flange portion 30b of member 30. The driving member 30 carries an inwardly facing annular pressure surface 32 adapted to be engaged by a clutch driven plate 33, of conventional construction. The driven plate 33 has a central hub portion 33a integral with hub portion 19 of the turbine and is splined to the output shaft 12. Clutch plate 33 is provided with suitable torsional vibration dampening means 34 and has a disc 35 interconnected to hub 33a thereby and adapted to carry friction material 35a at the outer periphery thereof. The lock-up clutch further comprises an annular actuating piston 36 having an inner periphery 36a adapted to slide on an interconnecting sleeve portion 38 integrally joining said hubs 19 and 33a; an outer periphery 36b thereof is adapted to slidingly engage an interior cylindrical surface 39 of the drive member 30. The actuating piston 36 has intermediate portion carrying an annular surface 40 adapted to engage an opposite side (from that engaged by flange surface 32) of the driven clutch plate 33 when hydraulically forced into engagement therewith. The actuating piston is limited in axial movement in a direction away from the clutch plate by an annular stop ring 41 received in an annular groove 42 in the surface 39 of the driving member 30. The actuating piston is maintained in axial alignment with member 30 during reciprocal movement by a plurality of circumferentially spaced drive pins 43 received in aligned openings 44 and 45 provided respectively in the outer margin of the piston 36 and in the driving member 30.

Particular attention should be directed to the disposition of piston 36 so that it divides the interior space enclosed by housing 15 into principally two chambers, one to the left side thereof in FIGS. 5 and 6 being referred to as the clutch chamber 46 and the one to the right being referred to as the turbine chamber 47; the clutch chamber 46 contains the rotatable clutch plate 33 and the turbine chamber 47 contains the turbine element 18 (here being preferably coupled for rotation with the clutch plate 33).

In FIG. 5, illustrating the fluid conditions experienced by the prior art, line pressure $P_1$ is fed to chamber 46 to positively disengage the piston 36 and thereby the clutch. During the disengaged condition of the clutch, an independent charge pressure $P_c$ is normally fed to the converter at the impeller inlet and withdrawn from the turbine chamber 47 at exhaust outlet $x$. This normal system requires the maintenance of separate pressure systems for both the clutch chamber and the converter operation. Clutch engagement is promoted by shutting off line pressure to the clutch chamber 46 and supplying line pressure to the converter which then would urge the piston to full clutch engagement.

The radial fluid distribution across both piston sides in the impeller chamber, is illustrated in the graphs of FIG. 5. These graphs show the fluid conditions when there is no orifice means communicating the clutch and turbine chambers and during the disengaged conditions of the clutch. In the impeller chamber, the fluid distribution has a static pressure contribution and a variable centrifugal pressure contribution resulting from the circulating velocity of fluid in the impeller chamber. Since the turbine chamber is fed with fluid from the impeller outlet which is disposed at the outer periphery of the housing 25, a pressure control point will occur at the outer periphery dictating that the pressure in the turbine chamber will always equal the pressure in the impeller chamber at that radial location. Thus, when the turbine is rotating at the same speed as the impeller, the fluid distribution in the turbine chamber will be similar to that in full line shown for the impeller chamber.

In the clutch chamber, a large static line pressure is supplied and the centrifugal pressure contribution will be the same as that in the turbine and impeller chambers provided the turbine (which is coupled to the clutch plate) is rotating at the same speed as the impeller. Under these circumstances the total fluid pressure working on the piston in the clutch chamber will always be greater than that in the turbine chamber. However, as the turbine assumes a lower speed than the impeller and accordingly the clutch plate, being coupled to the turbine, assumes a correspondingly lower speed, the centrifugal pressure heads will vary at each of the clutch and turbine chambers so that it is possible to achieve a higher pressure in the turbine chamber even though the clutch is in the intended disengaged condition, causing unwanted drag. The greater pressure in the turbine chamber will be caused by the compromise in speed between the housing 25 and the slower rotating turbine 18. Since the pressure at the outer periphery must always equal the impeller chamber pressure at the outer periphery, the centrifugal pressure curve as shown in broken outline will be forced to pass through that control point and thus draw fluid from the impeller chamber providing a higher total fluid pressure force in the turbine chamber.

Turning now again to the preferred embodiment obviating the drag of the prior art, the fluid controls (see FIG. 7) comprise a single pressure source which may be supplied from an engine driven pump (not shown) which can be selectively controlled to supply a reduced pressure to the converter (including turbine chamber 47), during the non-torque multiplying condition of the converter, while the clutch is engaged to transmit direct drive, and which fluid is permitted to pass from the turbine chamber 47 into the clutch chamber 46 by way of aperture means 70 (to be described more fully below) and thence from the chamber 46 back to sump to complete the fluid cycle. Clutch engagement is effected by the differential pressure force acting on the right-hand side of the piston 36 due to a pressure drop through orifice means 70. To effect clutch disengagement and establish torque multiplication through the converter 13, the line pressure is selectively supplied first to the clutch chamber 46 at a higher pressure value and permitted to flow through orifice means 70 into chamber 47 and thus charge the converter with fluid for operation; fluid thence passes from the converter back to sump to complete the fluid cycle. The piston 36 is disengaged again due to a pressure differential having a greater force on the left-hand side thereof, in FIGS. 6 and 7.

The variation in the centrifugal pressure heads has not been appreciated as a factor in contributing to unwanted drag of the clutch because all of the factors which provide or affect the centrifugal pressure heads have not been known. The centrifugal pressure heads in the chambers will be determined by the rotational speed of the fluid therein and will increase with greater radius. However, the rotational speed of the fluid will be an *approximate average* or compromise of the speed of the actuating piston 36, driving member 30, and that of the clutch plate 33 which is free to rotate therein at a different speed (here being that of the turbine). More particularly, the rotational speed in the plate chamber will be determined by the frictional drag forces upon the fluid. The presence of other members rotating at different speeds in these chambers has not been appreciated heretofore. Similarly, the rotational speed, in the turbine chamber, of the fluid will be determined by the housing portion 15b and the actuating piston 36 which imparts a primary rotation to the fluid and secondarily to the turbine 18 which will be rotating at an independent speed until the coupling range of the converter is reached. It can be seen from FIG. 5 that with the reverse acting type of lock-up clutch assembly and when the clutch plate speed is very low with the turbine stalled, the hydraulic force in the turbine chamber can become much larger than that created in the clutch plate chamber. Under these conditions, the clutch will tend to engage.

It is contemplated by this invention that to regulate and provide for a favorable variation in the centrifugal pressure head in each of the chambers, that aperture orifice means 70 must be employed in the element which divides (here being the actuating piston 36) the clutch chamber from the turbine chamber. The aperture means may consist of one or more orifices 70a each located at a specific radial distance from the axis of rotation of the clutch assembly. In FIG. 6A, each orifice 70a is aligned radially with an annular groove 75 in the clutch plate friction material 35a; the groove communicates with fluid drain grooves 75a extending transversely thereacross. The grooves 75 and 75a permit fluid to flow between the chambers 46 and 47 even when the clutch is engaged and the clutch plate 33 tends to cover the orifices 70a.

The control system 26 which incorporates the orifice means 70 more particularly comprises fluid conduit means 48 and 49, each adapted to be selectively placed in communication with a fluid pressure source 27 with the other conduit means communicating with the sump 37 from which the fluid supply is drawn. Fluid conduit means 48 comprises a bore 48a provided in an oil collector drum 50 (partly shown) which is keyed to the sleeve shaft 21 by pin 57; one end 52 (FIG. 7) of bore 48a is in communication with a valve 51 and an opposite end 53 of bore 48a opens into a chamber 48b defined between the drum 50 and a cylindrical element 55 (which is here drivingly connected to the torque converter impeller and may be used to drive a pump) (not shown). Chamber 48b is in fluid communication with the inlet to the impeller of the converter and thereby with chamber 47 by way of a radially extending bore 48c in a hub element 56. Fluid conduit means 49 comprises a bore 49a extending parallel to the shaft 12 and communicates with the valve 51; a biased bore 49b communicates bore 49a with the radially inner periphery of the drum 50. Drum 50 cooperates with the output shaft 12 in defining an inner chamber 49c. A radial bore 49d disposed in the output shaft 12 communicates with chamber 49c and longitudinally extending bore 49e communicates bore 49d with chamber 46 of the clutch assembly.

Valve 51 may be of the simple two-position spool type and comprises a spool member 59 slidable in a bore 60 defined within a valve housing 61. The bore 60 has four axially spaced annular recesses formed therein; recess 62 communicates with conduit means 49 and thereby with clutch plate chamber 46; recess 63 communicates with a fluid source 27 (line pressure); recess 64 communicates with conduit means 48 and thereby with chamber 47 of the converter; and recess 65 communicates with a chamber 66 defined in housing 61 by way of opening 67. Chamber 66 communicates with a cooler 68 and thence with the sump; the pressure in chamber 66 is regulated by valve 69 so that a sufficient back pressure is available during the stage when charging of a converter is by fluid from the clutch assembly. The valve member 59 is provided with three lands, 71, 72 and 73. Lands 72 and 73 are spaced apart longitudinally of the valve member so that when the valve member is moved to a position corresponding to "released" (as shown in FIG. 1), the space between said lands will communicate with both the line pressure inlet 74 and conduit means 49 leading to the plate chamber 46. In the released position of the valve member, the space between lands 71 and 72 communicates conduit means 48 leading to the turbine chamber 47 and the outlet bore 67 communicating with sump. Each of the lands are in sliding sealing engagement with the walls of the bore 60 so that the spaces between the lands will be independent of each other. When spool member 59 is moved to a position corresponding to "engaged" (as shown by the dotted line in FIG. 1), the space between lands 72 and 73 will communicate line pressure with fluid conduit means 48 leading to the turbine chamber.

The fluid conditions which will prevail in the chambers of the construction of FIG. 7 for the disengaged condition of the clutch are illustrated in FIG. 7a wherein line pressure is fed to the clutch chamber 46 with the housing 25 rotating at input speed $n$. The fluid distribution across the left-hand side of the pistons, when the clutch plate is rotating at substantially the same speed as the housing (the clutch plate being coupled to the turbine) will be as shown in FIG. 7a. The pressure at .707 of the radius of the circulating fluid body will be communicated through orifice 70 to the turbine chamber 47 providing a control for the distribution of pressure therein. Since orifice means 70 is not relatively large, there will be a slight pressure drop thereacross so that the balanced pressure in the turbine chamber will not be equal to the pressure at .707 in the plate chamber. The pressure in the turbine chamber will also be controlled at the outer periphery since the impeller chamber has a communication thereat which is controlled by a relief valve tending to maintain the pressure in the converter at a specific charge value. Thus any variation in the centrifugal pressure distribution in the turbine chamber must conform to these control values. Should the turbine and thereby the clutch plate rotate at a considerably lower speed than the housing or input member, the fluid distribution in the turbine chamber will assume that as shown in broken outline in FIG. 7a. However, since the average pressure force in the plate will always be equal to or greater than the average pressure force in the turbine chamber (due to the inherent communication of .707 of the radius) the clutch plate will never drag while the clutch is in the intended disengaged condition.

The pressure system as shown in FIG. 7 is valuable for reasons other than the obviation of drag because a unitary fluid cycle is maintained through both the clutch chamber and the converter by virtue of the orifice means 70 which provides fluid both for components without the necessity of independent fluid control means, thus reducing the cost of manufacture significantly. The small arrows accompanying the letter $f$ indicate the flow of the fluid through the chambers in the graphical illustrations of 7a and 7c.

For the engaged condition of the clutch, as illustrated in 7b and 7c, flow is reversed from that in FIG. 7 with the line pressure being supplied to the converter and ultimately to the turbine chamber and flows through the orifice means 70 and the plate grooves to be exhausted back to sump at the inner periphery of the clutch chamber 46. With flow proceeding from the impeller chamber to the turbine chamber, the static and centrifugal pressure heads will be substantially the same in each of the chambers when the turbine is rotating at the same speed as the housing. However, should the turbine turn at a slower speed, the centrifugal pressure head in the turbine chamber will be again controlled by the pressure regulation at the outer periphery of the turbine chamber (as promoted by the line pressure regulation being spilled from the impeller) so that the fluid distribution will vary according to that as shown in broken outline in the turbine chamber graph. Whether the plate chamber is provided with flow from the turbine chamber through aligned grooves provided in the clutch plate, or the plate chamber is sealed off by having no grooves therein, the fluid distribution will be devoid of static pressure while the centrifugal forces of the fluid will continue to exert influence. Thus, the distribution charts of FIG. 7c indicate that the engaged condition of the clutch is operable with the presence of the communicating orifice means 70.

Turning now to FIGS. 8–8c, there is illustrated another type of construction utilizing a positive acting lock-up clutch and torque converter combination typical of the art. Similar parts as in the preferred embodiment have similar reference numerals.

In this construction, the piston 36 is disposed on the side of the clutch plate remote from the converter so that positive fluid pressure must be used to engage the piston against the clutch plate. An independent barrier wall 80 is provided within the housing to define the clutch plate chamber independently of the turbine chamber. Thus, we have four distinct chambers: engaging chamber 81, clutch plate chamber 46, turbine chamber 47 and the impeller chamber 82. To disengage the clutch, fluid presrure used to charge the converter is communicated through means 83 in the barrier wall to the clutch plate chamber providing a disengaging pressure against the piston. In the known construction of FIG. 8, separate fluid control means must be provided for each of the engaging chamber and the converter; no continuous flow is provided between the engaging chamber and the clutch plate chamber. There are three principal ways in which the clutch plate chamber and barrier wall may be constructed according to prior art; the fluid conditions resulting from the three modes of construction are shown in FIGS. 8a, 8b and 8c.

The first way comprises providing communicating means 83 at the outer periphery of the barrier wall 80 communicating the turbine chamber and the clutch plate chamber; the fluid distribution will appear as illustrated in FIG. 8a for the released condition of the clutch wherein static and centrifugal pressure heads will be the same in the clutch and turbine chambers when the clutch plate is rotating at the same speed as the housing (the construction of FIG. 8 has the clutch plate independently rotatable from the turbine to illustrate another variable in this system. If the clutch plate is stalled, the centrifugal pressure distribution will be that as shown in broken outline in FIG. 8a for the clutch plate chamber. The location of the opening at the outer periphery thus becomes the radial control point for the variance in the centrifugal pressure curve and dictating that the centrifugal pressure at the inner periphery will be something other than zero. Since there are no rotating members within the engaging chamber, and the charge pressure is maintained sufficiently high, there will be little likelihood that the clutch will drag or unintentionally engage during the disengaged condition of the clutch. However, such constructions have shown a great difficulty in the engaged condition of the clutch since an extremely high line pressure must be utilized to overcome the charge pressure present in the converter to promote clutch engagement. This is a serious disadvantage and controls cannot be made economically to make this a practical construction.

The second way comprises putting the communicating means 83 at the inner periphery or internal diameter of the circulating fluid body; the fluid distributions will appear as that shown in FIG. 8b. The fluid conditions for the released condition of the clutch will again not experience appreciable drag although a slower rotating clutch plate will reduce the total pressure in the turbine chamber while the centrifugal pressure in the engaging chamber will remain the same. However, the serious difficulty here is during the engaged condition of the clutch. The control point for the centrifugal pressure distribution will be at the internal diameter of the circulating fluid body because of the location of the communicating means 83. Since the converter chamber will exhaust its fluid by a small orifice located at the internal periphery of the turbine, the centrifugal pressure head will be substantially zero at the radial inner location, in both the clutch plate and turbine chambers. Thus, a slower rotating clutch plate within the clutch plate chamber will cause a pressure distribution to be that as shown in broken outline in FIG. 8b for this construction, whereas the variance in the centrifugal head for the turbine chamber will be that as shown in the right-hand portion of FIG. 8b. Serious difficulty again is with the requirement for an extremely high line pressure that must be supplied to the engaging chamber to promote clutch engagement. It would be most impractical to provide a pressure source of such nature.

If the construction wherein an exhaust orifice is provided at the internal diameter of the clutch plate chamber, while utilizing either one of the communicating opening locations of FIG. 8a or 8b, the fluid conditions will be thus as shown in FIG. 8c during the released condition of the clutch. The total fluid force during such released condition will be due entirely to the centrifugal pressure head since no static pressure is communicated to either of these chambers. Thus as the clutch plate assumes a slower speed and ultimately becomes stalled, the centrifugal pressure distribution in this clutch plate chamber will be substantially less than that in the engaging chamber and will cause unwanted drag.

The above variations of the prior art construction of FIG. 8 each have shortcomings. The alternative embodiment of FIGS. 9a–9c and 10a–10b represents the improvement of this invention over the construction of FIG. 8 (similar parts are similarly identified as in the preferred embodiment). In this embodiment, the clutch plate 33 may either be formed to promote continuous flow of fluid from the engaging chamber to the turbine chamber during the engaged condition of the clutch or the clutch plate may be formed with a continuous type friction facing which would normally seal off the openings 70 during the engaged condition of the clutch. Under either of these constructions, the communicating means provides adequate and practical clutch engagement, shown by the fluid distribution charts of 9b and 9c. In FIG. 9b representing fluid conditions for the construction having no grooves in the clutch plate facings, the engaged condition of the clutch is represented. Here a small exhaust orifice (see symbol in FIG. 9b) is used at the inner periphery of the clutch plate chamber; fluid pressure present in the engaging chamber will be due to centrifugal forces of the residual fluid not exhausted through the small orifice. Thus, the system is practical because an excessively high line pressure is not required during the engaged condition. In FIG. 9c, the engaged condition for the construction of FIG. 9a is shown wherein the clutch plate facing has grooves 75a therein to aid in communicating the engaging chamber with the clutch plate chamber during the engaged condition of the clutch. An exhaust opening (X) must be provided at the internal periphery of the clutch plate chamber and the communicating orifice means 70 in the piston 36 is of a small nature so that a pressure drop ($\Delta p$) does occur between the two chambers as flow passes between the chambers. FIG. 9c differs from that of FIG. 9b in that a continuous flow takes place through the piston during the engaged condition to fill the clutch and converter, while the practical advantages of fluid balance again are maintained.

To illustrate the feasibility of the disengaged condition of the clutch provided with balancing holes in the construction of FIG. 8, FIGS. 10a–10b are provided. For exemplary purposes, the construction chosen incorporates an opening 83 in the barrier plate 80 located at the internal periphery of the turbine chamber. In this construction, a small exhaust orifice 84 is provided in the clutch plate chamber while the orifice means 70 communciating the clutch plate and engaging chambers is of a small nature so that a pressure drop does occur therebetween. As shown in FIG. 10b, fluid in both the engaging and clutch plate chambers will be exhausted leaving no static pressure and permitting the residual fluid pressure to have only centrifugal forces acting therein. No matter what velocity the circulating fluid body will obtain in the clutch plate chamber due to other freely rotatable members therein, the average pressure force will be communicated to the engaging chamber through the orifice means 70 and thus assure a balanced condition to prevent unwanted clutch drag.

FIGS. 11a–11d, illustrate still another embodiment of this invention incorporating another type of control system in cooperation with the communicating orifice means 70, the structural elements of the lock-up clutch and torque converter being the same as schematically illustrated in FIGS. 7 and 7b (similar reference numerals are used for the same parts). The control system 90 comprises a source of fluid pressure drawn from a sump 91 by a pump 92 which feeds line pressure through conduit means 93 to the leading portion of the impeller 17 of the torque converter. Interposed in the conduit means 93 is a pressure regulator valve 94 of conventional construction which provides a line pressure sufficient to operate the converter. Line pressure is fed continuously to the converter both during the torque converter range of operation with the clutch disengaged and during the direct drive condition of the transmission when the clutch is engaged. Fluid pressure leaves the torque converter by way of conduit means 95 communicating with the trailing edge of the turbine 18 at the inner periphery of the converter and leads to the sump 91. Interposed in the return conduit means 95 is a pressure relief valve 96 adapted to maintain an adequate back-pressure for the converter; also interposed in the return conduit means 95 is a cooler 97. To control operation of the clutch, a simple on and off type of valve 99 is used to control conduit means 98 communicating the clutch plate chamber 46 with the sump. The valve 99 comprises a spool member 100 slidable within a bore 101 in valve housing 61; conduit means 98 communicates with an annular groove 102 provided in the bore 101 and the bottom of the bore communicates with the cooler 97 and ultimately with the sump 91. The clutch is shown in the released condition in FIG. 11a and the controls 90 are accordingly shown in the position which prevents fluid pressure in the clutch plate chamber from returning to the sump.

The fluid pressure conditions in the chambers of the torque converter and lock-up clutch are shown in FIG. 11b for the blocked condition of conduit means 98. When the turbine is rotating at substantially the same speed as the housing or impeller of the torque converter, the static and centrifugal pressure forces will provide the pressure distribution as shown in FIG. 11b in solid outline. As the turbine assumes a slower speed and becomes stalled, the pressure distribution of centrifugal head will be as shown in broken outline and will be controlled by the outer peripheral back-pressure from the impeller chamber and by the communicating orifice means 70. The pressure in plate chamber 46 will be in balance with the pressure in the turbine chamber 47 since the average pressures are sensed and communicated between said chambers. A spring 103 may be employed between the housing and the piston to urge the clutch plate into disengagement and provide an extra safety factor to insure clutch disengagement, although this is not entirely necessary.

In FIGS. 11c and 11d, the condition of the engaged clutch of FIG. 11a is illustrated. In such condition, the valve spool 100 is moved to the engaged position so that the fluid conduit means 98 is open to sump relieving the clutch plate chamber of the static pressure force normally entrapped therein from the turbine chamber (the only fluid pressure retained in the clutch plate chamber will be due to centrifugal pressure forces). This construction employs communicating grooves 75a in the clutch plate facing so that fluid may flow through the communicating orifice 70 into the plate chamber from the turbine chamber during such engaged condition and while the piston is in full contact with the clutch plate.

FIGURES 12a–12d illustrate still another embodiment of this invention employing a reverse-acting lock-up clutch and torque converter combination; similar reference numerals will be used to indicate parts similar to the preferred embodiment. The control system for the construction of FIGURE 12a comprises a source of fluid pressure provided by pump 121 drawing fluid from a sump 122 and feeding line pressure by way of a conduit means 123 to the inlet portion of the torque converter impeller 17. A pressure regulator means 124 is provided in the conduit means 123 and is of conventional construction for regulating line pressure to a predetermined value sufficient to charge the torque converter for operation. Conduit means 125 communicates the outlet portion 126 of the turbine 18 with a sump 122; a pressure relief valve 127 is placed in conduit means 125 to provide a back-pressure for maintaining charge pressure within the converter. A cooler 128 is employed in the return conduit means 125.

To provide for operation of the lock-up clutch, conduit means 129 communicates an opening 130 at the inner periphery of the clutch plate chamber (the opening 130 being larger than the communicating orifice 70 in the piston, but sufficiently small to provide a pressure drop to the clutch plate chamber) with the sump. A control valve 131 having a spool member 132 is slidable in a bore 133 in valve housing 61. The valve is adapted to provide simultaneous flow of line pressure to the plate chamber 134 and converter during the released condition of the clutch (see full line position of valves), and drain the plate chamber 134 during the engaged condition of the clutch (see broken line position of valve).

FIG. 12b illustrates the fluid condition for the released clutch condition of FIG. 12a showing a balanced fluid condition with release spring 135 insuring disengagement. FIG. 12d shows the fluid conditions for the clutch engaged position of the controls where static pressure is relieved from the plate chamber; a stalled plate will not affect the released condition, as shown in broken outline in FIG. 12d.

The above several embodiments of this invention show the wide flexibility of arrangement that it permits; at the same time the invention provides simplicity and ease of adaptation to transmission devices in production and in the field. Furthermore, the invention permits a unitary fluid system having a reduced number of control elements to operate both a torque converter and a fluid operated clutch.

While we have described our invention in connection with certain specific embodiments thereof, it is to be understood that this is by way of illustration and not by way of limitation and the scope of our invention is defined solely by the appended claims, which should be construed as broadly as the prior art will permit.

We claim:

1. In a transmission device, a wet-type hydraulic clutch comprising: rotatable input and output members, a housing drivingly connected to said input member and having at least two chambers; a clutch plate disposed for rotation in one of said chambers and drivingly connected to said output member; clutch engaging means subject to and actuated by fluid pressure in each of said chambers whereby selective control of fluid pressure in at least one of said chambers provides clutch engagement or disengagement; and means disposed internally of said housing communicating said chambers for controlling the variance in pressure resulting from centrifugal forces in a manner so that the gross fluid pressure force acting on said engaging means in said chamber having said clutch plate will be equal to or greater than the gross pressure force acting on the engaging means in the other of said chambers during the clutch disengaged condition.

2. In a transmission device, a hydraulic clutch as in claim 1, in which the ratio of the distance between the center of rotation of said housing and the outer periphery of the fluid circulating in said chambers to the radial distance between the center of rotation of the housing and the center of said communicating means is substantially equal to .707.

3. In a transmission device, a wet-type hydraulic clutch, comprising: rotatable input and output shafts, a housing drivingly connected to said input shaft, an annular piston member disposed in said housing and dividing the space therein into first and second chambers; a clutch plate drivingly connected to said output shaft and disposed in said first chamber, a source of hydraulic pressure; means for selectively applying said fluid source to said second chamber for urging said piston toward said clutch plate to promote clutch engagement while exhausting said first chamber, and for selectively exhausting said first chamber while sealing off said second chamber to promote clutch disengagement; and aperture means disposed in said piston and communicating said chambers, aperture means being located at a predetermined radial distance from the axis of rotation of said housing whereby fluid forces in each of said chambers which may be attributed to centrifugal forces will be caused to vary in a manner so that the total fluid pressure acting on said piston from said second chamber will never become greater than the total fluid pressure acting on said piston from said first chamber during the clutch disengaged condition.

4. In a transmission device, a wet-type hydraulic clutch as in claim 3, in which said means communicating said first and second chambers is arranged to control the fluid pressure therein which is responsive to the circulating velocity of fluid therein without movement of fluid into or out of each of said chambers during the disengaged condition of said clutch.

5. In a transmission device, a wet-type hydraulic clutch as in claim 3, in which said control means is adapted to exhaust both said first and second chambers during the disengaged condition of said clutch.

6. In a transmission device, a wet-type hydraulic clutch as in claim 5, in which said communicating means disposed in said piston is adapted to control the variance of fluid pressure in each of said chambers responsive to a circulating velocity of fluid therein with an accompanying partial emptying of fluid from at least one of said chambers during the disengaged condition of the clutch.

7. In a transmission device, a wet-type hydraulic clutch, comprising: rotatable input and output members, a housing drivingly connected to said input member and having an annular piston member slidable therein dividing said housing interior into first and second chambers, a clutch plate rotatable within said first chamber and drivingly connected to said output member; a source of fluid pressure; control means adapted to selectively communicate said fluid source with said first chamber while exhausting said second chamber to promote clutch disengagement, and adapted to selectively communicate said fluid source with said second chamber while exhausting said first chamber to promote clutch engagement; and orifice means disposed in said piston communicating said chambers, said orifice means being disposed at a predetermined radial distance from said axis of rotation of said housing so that the total fluid pressure force acting upon opposite sides of said piston and which may be attributed to static as well as variable centrifugal pressure heads in said chambers will not cause unwanted clutch engagement regardless of the relative rotation between said clutch plate and housing.

8. A wet-type hydraulic clutch comprising: rotatable input and output members, a housing drivingly connected to said input member and having an element dividing said housing into at least two chambers, members disposed in at least one of said chambers capable of rotating at different speeds than said housing, actuating means adapted to provide engagement and disengagement of said clutch plate with said input member and being responsive to fluid pressure in both of said chambers, means disposed within said housing and adapted to equalize the total fluid forces acting against said actuating means irrespective of the rotative speeds of said housing or said members disposed in said chambers.

9. In a transmission device, a wet-type hydraulic clutch as in claim 7 which further comprises a source of fluid pressure, means adapted to communicate said fluid source with said second chamber and adapted to regulate said source so as to supply substantially reduced pressure to said second chamber during the disengaged condition of the clutch, said communicating means being disposed in said piston so as to control the pressure forces in said chambers responsible to the circulating velocity of fluid therein and adapted further to permit continuous flow of fluid from said source through both of said chambers and back to said source.

10. A transmission device as in claim 9, in which said turbine of said hydro-kinetic device is drivingly connected with said clutch plate.

11. A transmission device comprising: rotatable input and output members; a housing drivingly connected to said input member, a cylindrical piston disposed in said chamber adapted for sliding movement therein and dividing the interior thereof into at least first and second chambers, said piston further having orifice means communicating opposite sides thereof and having a sufficient size to permit fluid flow therethrough without pressure drop; a clutch plate disposed in said first chamber and drivingly connected with said output member, a hydro-kinetic device having a driven member disposed in said second chamber and said driven member being selectively connected with said output member; a source of fluid pressure, control means adapted to alternately connect said fluid source with said first chamber to provide clutch disengagement and to connect with said second chamber to provide clutch engagement, said control means being adapted to exhaust said first chamber so as to return fluid back to said source during the engaged condition and having means communicating with the outer periphery of the circulating fluid body of said first chamber adapted to provide a back pressure in said first chamber during the disengaged condition of the clutch, said orifice means disposed in said piston permitting a continuous flow of fluid from said first chamber to said second chamber in the disengaged condition of the clutch.

12. A transmission device comprising: rotatable input and output members; a housing drivingly connected with said input member; a cylindrical piston slidable within said housing and dividing the interior thereof into first and second chambers, said piston having orifice means communicating opposite sides thereof, a clutch plate disposed within said first chamber and drivingly connected with said output member; a hydro-kinetic device having a turbine disposed in said second chamber influenced by the pressure therein, control means having a source of fluid and being adapted to communicate said source with said second chamber both during the engaged and disengaged conditions of the clutch plate, said control means further being adapted to exhaust said first chamber during the engaged condition of the clutch plate and to seal off said first chamber during the disengaged condition of the clutch plate, said first chamber having inlet and outlet means independent of said orifice means to circulate fluid from said source back thereto, said orifice means being adapted to control the variation of fluid pressure in said first and second chambers which is responsive to the circulating velocity of fluid therein so that the fluid pressure acting on said piston within said first chamber during the disengaged condition of the clutch will be equal to or greater than the fluid pressure in said second chamber.

13. A transmission device comprising: rotatable input and output members, a housing drivingly connected to said input member, a cylindrical piston slidable in said housing and adapted to divide the interior thereof into first and second chambers, said piston carrying orifice means disposed therein at a predetermined location to communicate opposite sides thereof, a clutch plate disposed in said first chamber and drivingly connected to said output member, a hydro-kinetic device having a turbine disposed in said second chamber and drivingly connected to said output member, means providing a fluid barrier between said hydro-kinetic device and said clutch plate within said first chamber and having means providing limited fluid communication therebetween, control means having a source of fluid pressure and having means adapted to connect said source with said second chamber to provide clutch engagement and adapted to communicate said source with said first chamber to promote clutch disengagement while partially exhausting said second chamber, said orifice means in said piston being adapted to control the variation in fluid pressure in both of said chambers which is responsive to the circulating velocity of fluid therein while permitting transfer of fluid from said first chamber to said second chamber during the disengaged condition of the clutch plate.

14. A transmission device as in claim 13, in which said fluid barrier has said communicating means disposed near the outer periphery of said first chamber.

15. A transmission device as in claim 13, in which said barrier has said communicating means disposed near the radially inner periphery of said first chamber.

16. A transmission, comprising: a rotatable drive shaft; a rotatable driven shaft, at least one source of fluid pressure; means providing a first power train between said shafts including a fluid operated torque converter; means for providing an alternate power train between said shafts comprising a housing drivingly connected to said drive shaft, a clutch plate drivingly connected to said driven shaft, and a fluid actuated engaging means for providing conjoint rotation between said housing and clutch plate, said housing having at least two chambers for containing pressurized fluid therein and said clutch plate being disposed in one of said chambers, said engaging means having an actuated portion with one side subject to fluid pressure in said one chamber and the other side subject to fluid pressure in the other chamber; means adapted to provide fluid pressure to at least one of said chambers to effect engagement or disengagement; and means communicating said chambers to prevent the force of fluid pressure in said one chamber from becoming less than the fluid in said other chamber during the disengaged condition.

17. A transmission, comprising: a rotatable drive shaft, a rotatable driven shaft; means providing a first power train between said shafts including a fluid operated torque converter having a driven turbine; means for providing an alternate power train between said shafts including a lock-up clutch assembly comprising a housing, a clutch plate and a fluid actuated piston, said housing being drivingly connected to said drive shaft for rotation therewith and having the piston slidably disposed therein separating the interior of said housing into two chambers for containing pressurized fluid therein, said clutch plate being disposed in one of said chambers and drivingly connected to said driven shaft, said turbine being disposed in the other chamber, a source of fluid pressure alternately in communication with one of said chambers, said piston being dependent on differential pressures acting against opposite sides thereof for moving said piston into engagement with said clutch plate to provide conjoint rotation with said housing and for moving said piston away from said clutch plate for disengaging the lock-up clutch assembly when said transmission is transferring power through said first power train, said piston having at least one aperture therein communicating said chambers and adapted so that fluid pressure attributed to the centrifugal force of the fluid circulating in said chambers is regulated whereby the distributed force of said centrifugal pressure heads across the piston sides is caused to assume an equal or greater effect on the side adjacent the clutch plate than the opposite side thereof regardless of the variation in the relative rotational speeds between the clutch plate, housing and turbine.

18. A transmission, comprising: a rotatable drive shaft; a rotatable driven shaft; a source of fluid pressure; means providing a first power train between said shaft including a fluid operated torque converter having a driven turbine; means for providing an alternate power train between said shaft including a lock-up clutch assembly comprising a housing, a clutch plate and a fluid actuated piston, said housing being drivingly connected to said drive shaft for rotation therewith and having the piston slidably disposed therein separating the interior of said housing into two chambers for containing pressurized fluid therein, said clutch plate being disposed in one of said chambers and drivingly connected to said driven shaft, said turbine being disposed in the other chamber; first conduit means communicating said fluid source with said one chamber containing said clutch plate and second conduit means communicating said fluid source with said torque converter for charging same; spring means disposed in said chamber containing said clutch plate for providing a light force to disengage said piston from said cltuch plate, said torque converter having a fluid outlet in communication with said other chamber; control means adapted to control fluid flow through said first and second conduit means, said control means being adapted to move said piston axially for engaging said clutch plate to provide conjoint rotation with said housing by closing off said first conduit means and supplying said fluid source to said torque converter, said control means being adapted to disengage said piston from said clutch plate by supplying said fluid source to both said first conduit means and said second conduit means; and means communicating said chambers for providing a pressure differential on opposite sides of the piston during the disengaged condition of the piston from said clutch plate and adapted so that the fluid pressure attributed to the centrifugal force of fluid circulating in said chambers is regulated whereby the centrifugal pressure head in said one chamber will always be maintained greater or equal to the centrifugal head in said other chamber regardless of rotational speeds between the clutch plate, turbine and housing.

19. A transmission, as in claim 18, in which said turbine is drivingly connected to said clutch plate and said torque converter has a fluid outlet communicating with said other chamber and disposed adjacent the outermost radial extent of said housing, and said communicating means adapted to accommodate the torque converter charge fluid entering said second chamber when regulating the centrifugal pressure heads in said chambers so that the centrifugal pressure head in said one chamber is maintained equal to or greater than the centrifugal pressure head in said other chamber.

20. In a torque converter assembly having a housing, a lock-up clutch assembly including a pressure plate slidably mounted in said housing and dividing the interior of said housing into a first chamber and a second chamber, an impeller mounted in said second chamber and drivingly connected to said housing, a fixed reaction sleeve, a stator mounted in second chamber and over-runningly connected to said reaction sleeve, a sleeve shaft adapted to be connected to a power transmission gear set, a turbine mounted in said second chamber and connected to said sleeve shaft, a clutch plate positioned in said first chamber, a shaft for said clutch plate concentric with said reaction sleeve and said sleeve shaft, said torque converter assembly being particularly characterized by a control system which is adapted for feeding fluid at one pressure into said first chamber to disengage the clutch and thence into said second chamber for charging the converter at low range and for feeding fluid at high range directly into said second chamber to engage such clutch, said control system comprising at least one aperture formed in said pressure plate communicating said chambers, said aperture being spaced radially outwardly from the axis of said clutch plate shaft at a predetermined distance so that the distribution of fluid pressure resulting from the centrifugal and static pressure heads in said first chamber acting across the sides of the pressure plate will be caused to vary in a manner so that the total force due to the centrifugal and/or static pressure heads within the first chamber will be equal or greater as the relative rotational speed between the housing and clutch plate becomes greater.

21. A torque converter assembly, as in claim 20, in which the ratio of the distance of the center of said aperture from the clutch plate axis to the distance between the clutch plate shaft axis to the outermost extent of the housing interior is equal to or less than .707.

22. A torque converter assembly, as in claim 20, in which said clutch plate shaft and said sleeve shaft are fixed to prevent relative rotation therebetween.

23. In a torque converter assembly having a housing, a lock-up clutch assembly including a pressure plate slidably mounted in said housing and dividing the interior of said housing into a first chamber and a second chamber, an impeller mounted in said second chamber and drivingly connected to said housing, a fixed reaction sleeve, a stator mounted in said second chamber and overrunningly connected to said reaction sleeve, a sleeve shaft adapted to be connected to a power transmission gear set, a turbine mounted in said second chamber connected to said sleeve shaft, a clutch plate positioned in said first chamber, a shaft for said clutch plate concentric with said reaction sleeve and said sleeve shaft, means normally biasing said clutch plate and pressure plate apart, a control system for feeding fluid simultaneously and independently to each of said chambers and at one pressure so that the combined effect of said biasing means and fluid pressure in said first chamber will be sufficient to maintain said clutch plate and pressure plate disengaged, and said control system being adapted to feed fluid at one pressure only to said second chamber for overcoming the effect of said biasing means for interengaging said clutch plate and pressure plate, said control system being further particularly characterized by an aperture formed in said pressure plate and communicating said chambers, said aperture being spaced radially outwardly from the axis of said clutch plate shaft a predetermined distance so that the pressure distribution resulting from said centrifugal forces acting across the pressure plate sides will be modulated to maintain or increase the total pressure force in said first chamber when the clutch plate assumes a slower rotational speed than said housing.

24. A torque converter assembly, as in claim 23, in which the ratio of the distance of the center of said aperture from said clutch plate shaft is to the radial distance between the outermost extent of the housing interior and clutch plate shaft is equal to or less than .707.

25. A torque converter assembly, as in claim 23, in which the sleeve shaft and said clutch plate shaft are fixed against relative rotation therebetween.

26. A torque converter assembly, as in claim 23, in which the distance of said aperture from said clutch plate shaft axis is adapted to insure that the centrifugal pressure distribution within said first chamber will always be greater than the centrifugal pressure head in said second chamber when there is a differential of speed between said clutch plate and housing even though the radial dimension of said clutch plate is different than the radial dimension of said pressure plate.

27. In a torque converter assembly having a housing with a wall therein dividing the interior thereof into at least two chambers, said wall providing fluid communication between said chambers at its radially inner extent, a lock-up clutch assembly including a pressure plate slidably mounted in one of said chambers and a clutch plate positioned in said one chamber intermediate said pressure plate and housing wall, an impeller mounted in the other chamber and drivingly connected to said housing, a fixed reaction sleeve, a stator mounted in the other chamber and overrunningly connected to said reaction sleeve, a sleeve shaft adapted to be connected to a power transmission gear set, a turbine mounted in the other chamber and connected to said sleeve shaft, a shaft for said clutch plate concentric with said reaction sleeve and said sleeve shaft, a control system for charging said converter at low range and thence sequentially into said other chamber and said one chamber for disengaging said clutch and for feeding fluid at high range directly into said one chamber against the side of said pressure plate opposite the clutch plate for engaging said clutch assembly, said control system being particularly characterized by said housing wall having an aperture formed therein and spaced radially outwardly from the clutch plate shaft a distance adapted so that the pressure distribution resulting from centrifugal forces acting across the housing wall sides will be modulated to increase the total pressure force in the portion of said one chamber containing said clutch plate when the clutch plate assumes a slower rotational speed than said housing.

28. In a torque converter assembly, as in claim 27, in which the ratio of the distance of the center of said aperture from the clutch plate shaft axis to the radial distance between the outer extent of the housing interior and the clutch plate shaft axis is equal to or less than .707.

29. A torque converter assembly, as in claim 27, in which said assembly comprises a biasing means normally urging said pressure plate into engagement with said clutch plate, said control system being adapted so that upon charging said torque converter with fluid said biasing means will be overcome and said clutch will be disengaged, and said control system being adapted so that upon feeding fluid into said first chamber against the side of said pressure plate opposite the clutch plate the clutch will be engaged.

30. A wet type clutch mechanism comprising: rotatable input and output members; means defining at least two fluid chambers and being drivingly connected to said input member; piston means disposed in said chamber defining means and being subject to the pressures in each of said chambers so as to be actuated to either of an engaged or disengaged condition; clutch means disposed in one of said chambers and being drivingly connected with said output member; control means for selectively applying fluid pressure to at least one of said chambers to promote engagement or disengagement of said piston means; and means disposed within said chamber defining means communicating each of said chambers and having a predetermined location for controlling the fluid pressure relationship between said chambers.

References Cited by the Examiner

UNITED STATES PATENTS

| | | | |
|---|---|---|---|
| 2,702,616 | 2/55 | Black et al. | 192—3.2 |
| 2,793,726 | 5/57 | Jandasek | 192—3.2 |
| 2,992,713 | 7/61 | Stump et al. | 192—3.2 |

DON A. WAITE, *Primary Examiner.*

DAVID J. WILLIAMOWSKY, *Examiner.*